(12) United States Patent
Cieslewski et al.

(10) Patent No.: US 11,156,583 B1
(45) Date of Patent: Oct. 26, 2021

(54) SYSTEMS, METHODS AND TOOLS FOR SUBTERRANEAN ELECTROCHEMICAL CHARACTERIZATION AND ENTHALPY MEASUREMENT IN GEOTHERMAL RESERVOIRS

(71) Applicants: National Technology & Engineering Solutions of Sandia, LLC, Albuquerque, NM (US); Xuhua Gao, Stanford, CA (US); Roland N. Horne, Stanford, CA (US)

(72) Inventors: Grzegorz Cieslewski, Sandia Park, NM (US); Xuhua Gao, Stanford, CA (US); Ryan Falcone Hess, Albuquerque, NM (US); Avery T. Cashion, IV, Albuquerque, NM (US); William C. Corbin, Albuquerque, NM (US); Sasha Egan, Belen, NM (US); Roland N. Horne, Stanford, CA (US)

(73) Assignees: National Technology & Engineering Solutions of Sandia, LLC, Albuquerque, NM (US); The Board of Trustees of the Leland Stanford Junior University, Stanford, CA (US)

( * ) Notice: Subject to any disclaimer, the term of this patent is extended or adjusted under 35 U.S.C. 154(b) by 404 days.

(21) Appl. No.: 15/889,118

(22) Filed: Feb. 5, 2018

Related U.S. Application Data

(60) Provisional application No. 62/454,194, filed on Feb. 3, 2017.

(51) Int. Cl.
*G01K 17/00* (2006.01)
*G01N 27/416* (2006.01)
(Continued)

(52) U.S. Cl.
CPC .......... *G01N 27/4162* (2013.01); *F24T 10/20* (2018.05); *F24T 10/30* (2018.05); *G01K 17/08* (2013.01); *F24T 2201/00* (2018.05)

(58) Field of Classification Search
CPC combination set(s) only.
See application file for complete search history.

(56) References Cited

U.S. PATENT DOCUMENTS 6,740,216 B2 * 5/2004 Diakonov ............... E21B 49/08
204/416
9,863,243 B1 * 1/2018 Hess ..................... E21B 47/011
(Continued)

OTHER PUBLICATIONS

Hess et al. "Development of a downhole tool measuring real-time concentration of ionic tracers and pH in geothermal reservoirs", Proceeding of SPIE, vol. 9113, 2014. (Year: 2014).*
(Continued)

*Primary Examiner* — Lisa M Caputo
*Assistant Examiner* — Nasir U. Ahmed
(74) *Attorney, Agent, or Firm* — Daniel J. Jenkins

(57) ABSTRACT

The present disclosure is directed to systems, methods and tools that measure ionic concentrations and downhole enthalpy of a flowing geothermal fluid in real-time at high-temperature and pressure. The systems, methods and tools include measuring the concentration of selected naturally occurring ions found in the liquid phase of the geothermal fluid throughout the wellbore using novel electrochemical sensor technologies. The change in liquid-phase ion concentration will be used to calculate the proportion of liquid to steam and allow for accurate enthalpy measurements. The techniques and technologies described here can be applied to any application of electrochemical sensing in extreme environments.

7 Claims, 9 Drawing Sheets

(51) Int. Cl.
*F24T 10/20* (2018.01)
*G01K 17/08* (2006.01)
*F24T 10/30* (2018.01)

(56) References Cited

U.S. PATENT DOCUMENTS

| | | | |
|---|---|---|---|
| 2004/0118682 A1* | 6/2004 | Murray | G01N 27/3335 204/418 |
| 2014/0251601 A1* | 9/2014 | Wang | E21B 47/065 166/250.01 |

OTHER PUBLICATIONS

Hess et al. Development of a downhole tracer and pH measurement instrument application in geothermal wells: Toward real-time chemical well loggice, Sandia Lab, Report SAD2013-7430C, 2013. (Year: 2013).*

Yoon-Soo Parka, Hyun Joo Bang b, Seh-Min Ohc, Yang-Kook Sunb,**, Sung-Man Leea, "Effect of carbon coating on thermal stability of natural graphite spheres used as anode materials in lithium-ion batteries" (Year: 2009).*

* cited by examiner

SYSTEMS, METHODS AND TOOLS FOR SUBTERRANEAN ELECTROCHEMICAL CHARACTERIZATION AND ENTHALPY MEASUREMENT IN GEOTHERMAL RESERVOIRS

CROSS-REFERENCE TO RELATED PATENT APPLICATIONS

This patent application claims priority from and the benefit of U.S. Provisional Patent Application Ser. No. 62/454,194, filed Feb. 3, 2017, entitled "Systems, Methods and Tools for Subterranean Electrochemical Characterization and Enthalpy Measurement in Geothermal Reservoirs," which is hereby incorporated by reference in its entirety.

STATEMENT OF GOVERNMENT INTEREST

The United States Government has rights in this invention pursuant to Contract No. DE-AC04-94AL85000 between the United States Department of Energy and Sandia Corporation, and Contract No. DE-NA0003525 between the United States Department of Energy and National Technology & Engineering Solutions of Sandia, LLC, for the operation of the Sandia National Laboratories.

FIELD

The present disclosure is generally directed to evaluating geothermal resources, and more particularly, to systems, methods and tools that measure geothermal enthalpy to evaluate geothermal resources.

BACKGROUND

The amount of thermal energy (enthalpy) contained in geothermal fluid is one of the key parameters used to determine the value of a geothermal resource and vital in understanding the performance of existing reservoirs.

The enthalpy of a single-phase fluid can be determined from the temperature, pressure and flow rate of the fluid; however, geothermal fluid flow often is multi-phased and enthalpy calculations require knowledge of the steam fraction and flow rate of each phase. Current surface-based methods for measuring enthalpy are expensive and complicated while providing an incomplete view of the wellbore. Additionally, current methods for measuring the total enthalpy (H) of geothermal fluids are conducted using surface based instrumentation and have a number of drawbacks. A common method used by the industry is the tracer dilution technique and involves precise continuous injection of tracers into the surface pipeline and concurrent sampling downstream from the injection point. The samples then have to be cooled and depressurized to be analyzed in an off-site laboratory. Cooling and pressure change can cause errors in measurement of tracers.

Other methods for measuring enthalpy at the surface involve measuring resistivity and acoustic waves. The resistivity method measures resistance of the flowing two-phased fluid and correlates it to the steam-water present. While this approach can yield meaningful results it is not suitable for all types of two-phase flow. The acoustic method involves generating and recording acoustic waves at a particular chosen frequency. The received amplitude is then correlated with the two-phase flow rate. The results published show good correlation; however, a careful calibration is required as well as selection of the optimal frequency. Finally, there have been attempts at measuring the downhole enthalpy in the past using optical methods. Optical methods involve measuring the refractive index at of the fluid at the tip of a very thin fiber optic probe. As steam bubbles pass by the tip of the probe, a change in refractive index is observed. Based on this measurement, the steam-water ratio can be determined. While this technique showed promise in a laboratory setting it would have limited utility in a downhole setting due to effects of geothermal fluid on the probe and fiber optic cable. Such a tool would be susceptible to hydrogen darkening making the fiber measurement more difficult. Additionally, the method needs to be calibrated with flow velocity.

A need remains for systems, methods and tools that can accurately predict the amount of thermal energy (enthalpy) contained in a geothermal reservoir.

SUMMARY OF THE DISCLOSURE

The present disclosure is directed to systems, methods and tools that measure downhole enthalpy of a flowing geothermal fluid in real-time at high-temperature and pressure. The systems, methods and tools include measuring the concentration of selected naturally occurring ions found in the liquid phase of the geothermal fluid throughout the wellbore using novel electrochemical sensor technologies. The change in liquid-phase ion concentration will be used to calculate the proportion of liquid to steam and allow for accurate enthalpy measurements. The techniques and technologies described here can be applied to any application of electrochemical sensing in extreme environments.

The present disclosure is further directed to systems, methods and tools that include disposing a tool in a wellbore to determine specific ionic concentration profiles over the depth of the wellbore. The ionic concentration data may be sued for mapping fracture connectivity, computing enthalpy and for performing other in-situ downhole chemical diagnostics.

According to an embodiment of the disclosure, a device is disclosed that includes a pressure transducer, a chloride ion selective electrode, an ionic strength reference electrode, a thermocouple, and an electronic package comprising a high temperature circuit board capable of processing the pressure transducer, the chloride ion selective electrode, the reference electrode and a thermocouple.

According to another embodiment of the disclosure, a system is disclosed that includes a device and a processing system that receives data from the device and computes a reservoir enthalpy of a geologic formation. The device includes a pressure transducer, a chloride ion selective electrode, an ionic strength reference electrode, a thermocouple, and an electronic package comprising a high temperature circuit board capable of processing the pressure transducer, the chloride ion selective electrode, the reference electrode and a thermocouple According to another embodiment of the disclosure, an ionic strength reference electrode is disclosed that includes a bimodal pellet comprising a first portion and a second portion. The first portion comprises a plurality of composite particles comprising a graphite microsphere core, a silver coating surrounding the core, and a silver layer surrounding the silver coating, and the second portion comprises a salt crystal.

According to another embodiment of the disclosure, a method is disclosed that includes inserting a tool into a well in a geologic formation, measuring temperature, fluid velocity, and pressure at one or more locations in the well, calculating enthalpy at the one or more locations in the well, and calculating enthalpy for the geologic formation.

An advantage of the present disclosure is that in-situ enthalpy measurements can be accurately taken.

Another advantage of the present disclosure is that the systems and tools are capable of functioning at high temperatures without the use of a Dewar.

BRIEF DESCRIPTION OF THE FIGURES

Wherever possible, the same reference numbers will be used throughout the drawings to represent the same parts.

DETAILED DESCRIPTION OF THE DISCLOSURE

Figure 1:
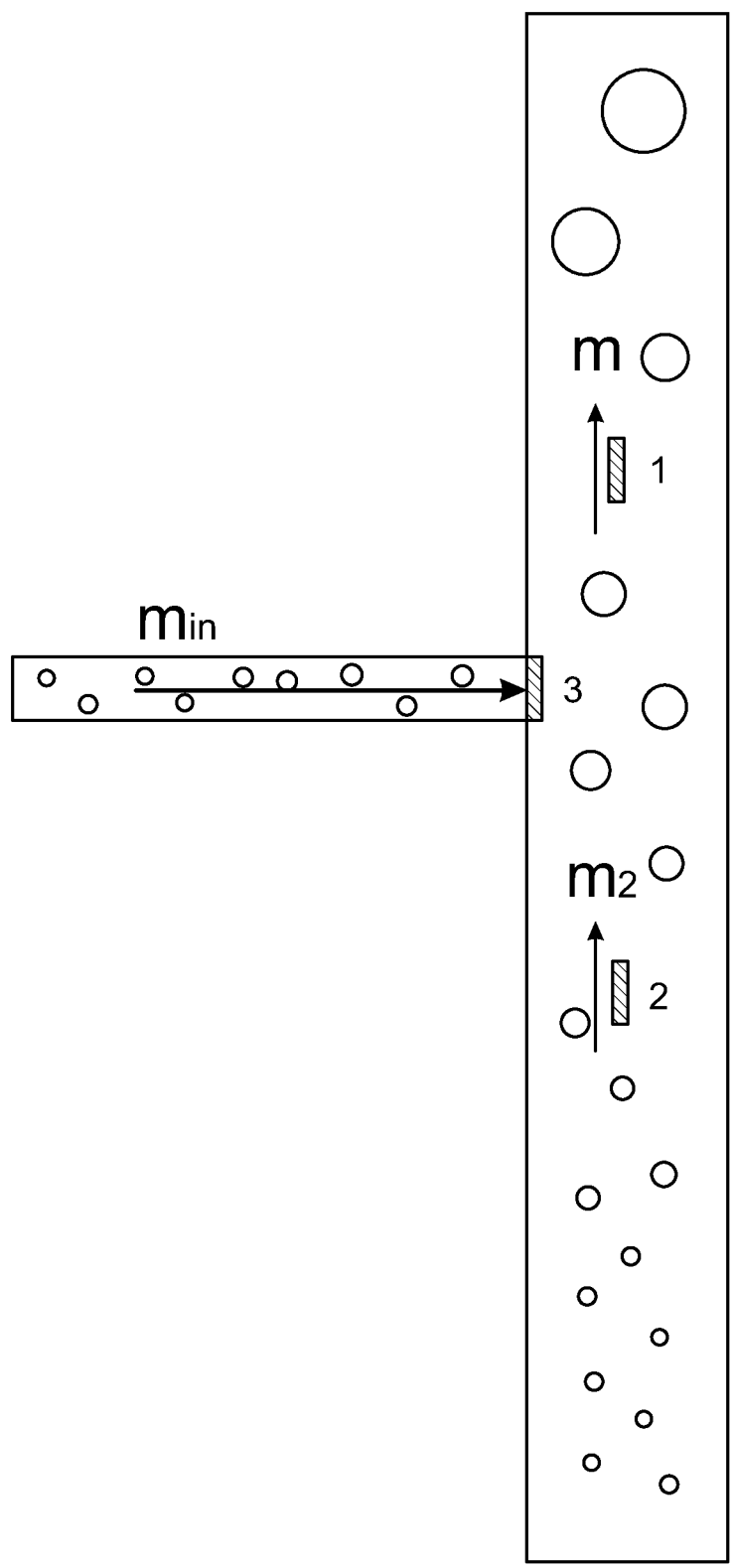
FIG. 1 is a schematic of the layout of tools in the well.

The present disclosure is directed to systems, methods and tools that measure downhole enthalpy of a flowing geothermal fluid in real-time at high-temperature and pressure. The systems, methods and tools include measuring the concentration of selected naturally occurring ions found in the liquid phase of the geothermal fluid throughout the wellbore using novel electrochemical sensor technologies. The change in liquid-phase ion concentration are used to calculate the proportion of liquid to steam and allow for accurate enthalpy measurements. The herein disclosed techniques and technologies can be applied to any application of electrochemical sensing in extreme environments.

The present disclosure is further directed to systems, methods and tools that utilize an electrochemical sensor in a wireline tool having two ruggedized electrodes: a chloride ion selective electrode (Cl-ISE) and an ionic strength reference electrode, hereinafter referred to as a reference electrode. A system including the electrodes and a data acquisition and processing system capable of functioning at high temperatures is disclosed. The system can be used without the use of thermal insulation or active cooling a to cool electronics in the tool, for example, without the use of a Dewar.

The present disclosure is further directed to methods that include, at each depth, taking measurements, including, chloride concentration, temperature, pressure, and flowrate data to determine enthalpy in the geothermal fluid.

The disclosed systems, methods and tools provide the ability to collect data for enthalpy determinations in real-time and allow for the identification of specific fractures where optimal enthalpy conditions exist. These measurements rely on the capability to determine steam fractions and the flow rates associated with each phase. To accomplish this goal, the disclosed techniques provide a wireline tool capable of measuring chloride ion concentration, temperature, pressure, and flowrate. Chloride concentration determinations throughout the wellbore provides a route to measure the steam-to-liquid fraction, as more liquid would result in a more dilute solution and more steam would result in a more concentrated solution. The tool can operate at temperatures up to 225° C. without the use of a Dewar, pressure up to 3000 psi, and measurement of chloride ions at the part per million level. Currently, the ruggedized Cl-ISE shows Nernstian responses for chloride concentrations in the 10-3 M to 10-1 M range from ambient temperature to 200° C.

Enthalpy of single-phase flow can be obtained directly from measurement of temperature, pressure and flow rate. However, geothermal fluid is often in two-phase flow in the wellbore and the reservoir, and flowing steam fraction would be required to determine the total enthalpy of steam and liquid.

Measuring or calculating flowing steam fraction downhole is not trivial due to the velocity difference between the gas phase and the liquid phase. Atalay (2008) introduced a method to measure gas velocity and void fraction with fiber optics. Spielman (2003) and Juliusson et al (2006) proposed that resistivity measurement with sufficient resolution could also be used to determine gas velocity and void fraction. In both methods, the flowing steam fraction is calculated from gas velocity, liquid velocity and void fraction. Both methods are only applicable in bubble flows and require other equipment to measure liquid velocity at the same time.

The tracer dilution technique can be applied to measure the liquid mass flow rate and the steam mass flow rate using ionic tracers in the liquid phase and vapor tracers in the steam phase respectively. Precisely metered injection of the tracers is required in this technique (Hirtz et al. 1993). For vapor phase tracers, it is difficult to determine the amount of tracer gas dissolved in the liquid phase, which is a major drawback of this method (Lovelock, 2001). In addition, it is necessary to consider the chemical cost of injection and the precipitation of inorganic ion tracers in the pipe.

Gao et al. (2017) proposed a model to calculate downhole enthalpy based on chloride concentration. With a single feed zone, chloride mass balance and total mass balance of steam and liquid are applied to calculate downhole flowing steam fraction and enthalpy, as shown in Equations (1)-(4).

$$d(Cl \cdot q_l) = 0 \tag{1}$$

$$d(\dot{m}) = d\left(\rho_l \cdot \frac{q_l}{1-x}\right) = 0 \tag{2}$$

$$x = 1 - \frac{q_{ldownhole}\rho_l}{\dot{m}} \tag{3}$$

$$h_t = (1-x)h_l + x h_s \tag{4}$$

where Cl is chloride concentration, $q_l$ is volumetric flow rate of the liquid phase, $\dot{m}$ is total mass flow rate, $\rho_l$ is the density of liquid phase, x is flowing steam fraction, $q_{ldownhole}$ is downhole volumetric flow rate of the liquid phase, $h_t$ is total flowing enthalpy, $h_l$ is the enthalpy of liquid water, and $h_s$ is the enthalpy of steam.

In the case of multiple feed zones, Gao et al. (2017) demonstrated that liquid flow rate from the feed zone could be obtained by assuming the chloride concentration of the liquid from the feed zone is measurable at the inlet of the feed zone. FIG. 1 shows a schematic of the layout of tools in the well.

The small black rectangles in FIG. 1 represent the tools for chloride concentration measurement. The concentration measured by device 3 is the key parameter. Chloride mass balance is applied to calculate liquid flow rate using the concentrations measured by device 1, 2, and 3 in FIG. 1, as illustrated by Equations (5)-(6).

$$q_{lin} \cdot Cl_{in} + (q_l - q_{lin}) \cdot Cl_{below} = q_l \cdot Cl_{above} \tag{5}$$

$$q_{lbelow} = q_l - q_{lin} \tag{6}$$

where $q_{lin}$ is volumetric flow rate of the liquid from the feed zone, $C_{lin}$ is the chloride concentration of the liquid from the feed zone (measured by device 3), $q_l$ is total volumetric flow rate of the liquid phase (i.e. the liquid flow rate above the feed zone), $Cl_{below}$ is the chloride concentration of the liquid below the feed zone (measured by device 2), $Cl_{above}$ is the chloride concentration of the liquid above the feed zone (measured by device 1), and $q_{lbelow}$ is volumetric flow rate of the liquid phase below the feed zone. Note that $q_{lin}$ is the only unknown in Equation (5) and can be calculated. However, the model has trouble in determining the steam flow rate and the enthalpy with multiple feed zones.

This disclosure describes a modification and enhancement of the method proposed by Gao et al. (2017) in the following aspects:

A new model is proposed to calculate steam flow rate from the feed zone in the case where multiple feed zones exist, which allows for estimation of the enthalpy from each feed zone. Multiple feed zones are common in geothermal fields, so this modification enhances the practical application of the approach.

Gao et al. (2017) showed only an analytical model, while in this paper an experimental study of the downhole tool is included along with discussion on the development, fabrication of a new solid-state reference electrode, and initial test results demonstrating the ability of the new tool to measure chloride concentration in two-phase wells.

The assumption that the chloride concentration measured at the inlet of the feed zone can represent the exact concentration of the liquid from the feed zone plays an important role in the model and influences the accuracy of the model. Experimental study was conducted to examine the validity of this important assumption.

Computational fluid dynamic (CFD) simulation of the feed zone behavior was carried out using ANSYS Fluent and compared to the experimental results.

Analytical Model

In two-phase geothermal wells with multiple feed zones, it is difficult to determine the specific amount of liquid and steam contributed by each feed zone. Above, it was explained that liquid contribution from the feed zone can be obtained by measuring chloride concentration of the liquid from the feed zone. The model discussed in this section focuses on calculating steam flow rate from the feed zone.

Measurement of temperature is much easier than measurement of gas velocity and void fraction. It is feasible to measure the temperature of the in-flowing geothermal fluid from the feed zone, and then apply the energy balance to calculate flow rate from the feed zone.

Saturated steam enthalpy and liquid enthalpy can be determined by measuring temperature or pressure. Due to the existence of geothermal gradient, different feed zones often have different temperatures and steam enthalpies. This difference can be harnessed, and an energy balance can be applied to determine the amount of steam from each feed zone.

The energy balance indicates that the total energy in the fluid above the feed zone equals the energy in the fluid coming from the feed zone and the energy in the fluid below the feed zone, as shown in Equation (7).

$$m_{lbelow}h_{l0} + m_{sbelow}h_{s0} + m_{lin}h_{lin} + m_{sin}h_{sin} = m_{labove}h_{l1} + m_{sabove}h_{s1} \tag{7}$$

Variable descriptions from Equation (7) are shown in Table 1.

TABLE 1

| | Variables in Equation (7) | | | |
|---|---|---|---|---|
| | Variables | Above the feed zone | From the feed zone | Below the feed zone |
| Steam | Mass flow rate | $m_{sabove}$, known from the single feed zone model proposed by Gao et al. (2017) | $m_{sin}$ | $m_{sbelow}$ |
| | Enthalpy | $h_{s1}$, known from temperature or pressure | $h_{sin}$, known from temperature measurement at | $h_{s0}$, known from temperature or pressure measurement |

TABLE 1-continued

| | | Variables in Equation (7) | | |
|---|---|---|---|---|
| | Variables | Above the feed zone | From the feed zone | Below the feed zone |
| Liquid | Mass flow rate | $m_{labove}$, known from the single feed zone model proposed by Gao et a;. (2017) | measurement the feed zone $m_{lin}$, known from the Equation (5)-(6) | $m_{lbelow}$, known from the Equation (5)-(6) |
| | Enthalpy | $h_{l1}$, known from temperature or pressure measurement | $h_{lin}$, known from the temperature measurement at the feed zone | $h_{l0}$, known from temperature or pressure measurement |

From Table 1, $m_{sin}$ and $m_{sbelow}$ are the only two unknown variables in Equation (7), and the mass balance of steam gives that:

$$m_{sbelow} + m_{sin} = m_{sabove} \quad (8)$$

Combining Equation (8) and Equation (7), the steam mass flow rate from the feed zone and the steam mass flow rate below the feed zone can be solved. $m_{sbelow}$ and $m_{lbelow}$ can be used to calculate flowing steam fraction and enthalpy below the feed zone:

$$x = \frac{m_{sbelow}}{m_{lbelow} + m_{sbelow}} \quad (9)$$

$$h_t = (1-x)h_{l0} + xh_{s0} \quad (10)$$

Figure 2:
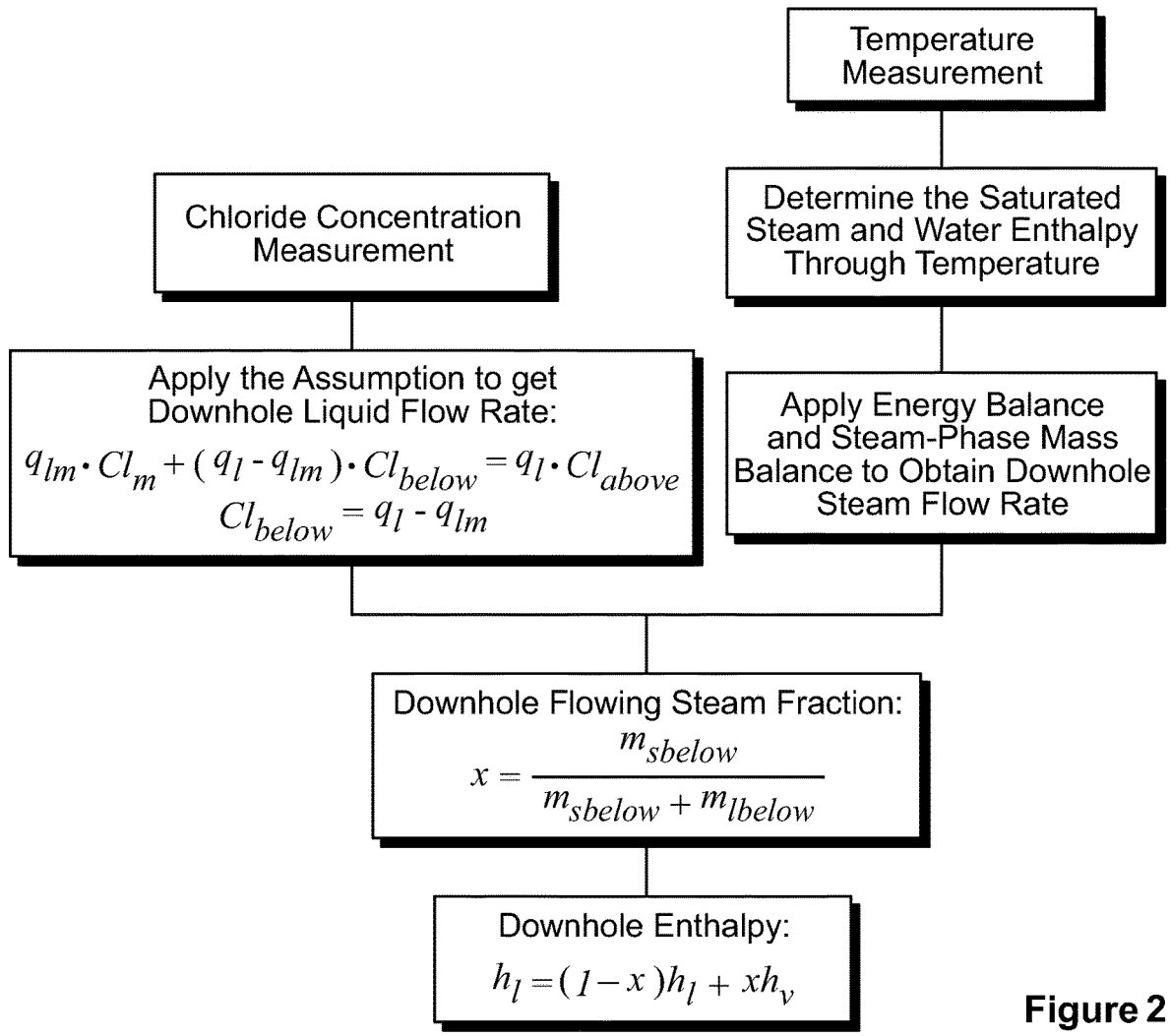
FIG. 2 is a roadmap of calculating enthalpy with multiple feed zones according to an embodiment of the disclosure.

FIG. 2 shows a roadmap of the method.

An example of applying energy balance and mass balance to calculate enthalpy with multiple feed zones is provided, as shown in Table 2.

TABLE 2

| | An example for enthalpy calculation with multiple feed zones | | | |
|---|---|---|---|---|
| | Surface | Downhole (above feed zone) | Downhole (at the depth of feed zone) | Downhole (below feed zone) |
| Input | Pressure: 12.55 bar-a; Total mass flowrate: 50 kg/s; Steam fraction: 0.419; Chloride concentration: 400 g/m³ | Chloride concentration: 300 g/m³; Pressure: 55.06 bar-a; | Chloride concentration: 280 g/m³; Temperature: 260° C. | Chloride concentration: 320 g/m³; Temperature: 280° C. |
| Output | | Flowing steam fraction: 0.3214; Enthalpy: 1701 kJ/kg; | Steam fraction: 0.1571; Enthalpy: 1396 kJ/kg | Steam fraction: 0.4304 Enthalpy: 1901 kJ/kg |

In the example, total mass flow rate above the feed zone is 50 kg/s with a total flowing enthalpy of 1701 kJ/kg. The steam fraction above the feed zone is 0.3214. The liquid mass flow rate from the feed zone is 16.9 kg/s, and the liquid mass flow rate below the feed zone is 17.1 kg/s. The temperature measured at the feed zone is 260° C., indicating a steam enthalpy of 2796.6 kJ/kg and a liquid enthalpy of 1134.8 kJ/kg. The temperature measured below the feed zone is 280° C., indicating a steam enthalpy of 2779.8 kJ/kg and a liquid enthalpy of 1236.7 kJ/kg. Steam flow rates from and below the feed zone are calculated to be 3.15 kg/s and 12.92 kg/s respectively. The total flowing enthalpy below the feed zone is 1901 kJ/kg.

Figure 3:
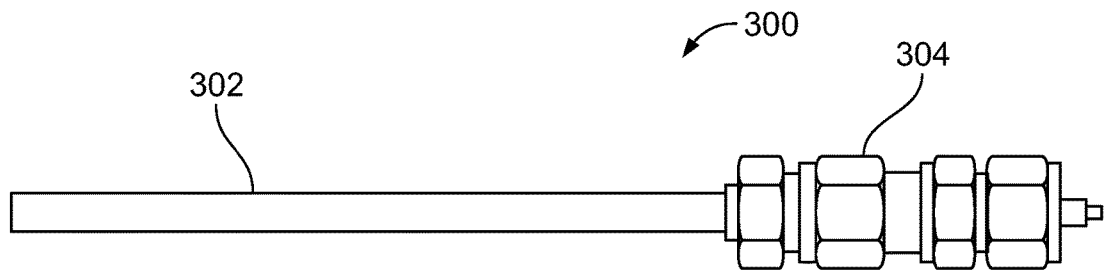
FIG. 3 shows a ruggedized Cl-ISE electrode assembly according to an embodiment of the disclosure.

FIG. 3 shows a ruggedized Cl-ISE electrode assembly 300 according to an embodiment of the disclosure. As can be seen in FIG. 3, the ruggedized Cl-ISE electrode assembly 300 includes a ruggedized Cl-ISE electrode 302 and an electrode connector 304. The electrode connector 304 may be any connector capable of connecting and sealing the ruggedized Cl-ISE electrode 302 to a member.

The Cl-ISE electrode is composed of three main parts: an ion selective membrane (ISM) that is selective for only chloride ions (Cl⁻), an electron conductor, and the electrode body and high-pressure fitting. In an embodiment, the ion selective membrane may be a 0.25 in diameter pellet containing an equimolar mixture of silver sulfide and silver chloride ($Ag_2S/AgCl$). The purpose of the membrane is to selectively measure Cl⁻ ions. The ISM is connected to an electron conductor such as, but not limited to a nickel rod using a small amount of silver-based conducting epoxy. The ISM and nickel rod are encapsulated inside a FEP and PTFE tube, respectively.

Figure 3A:
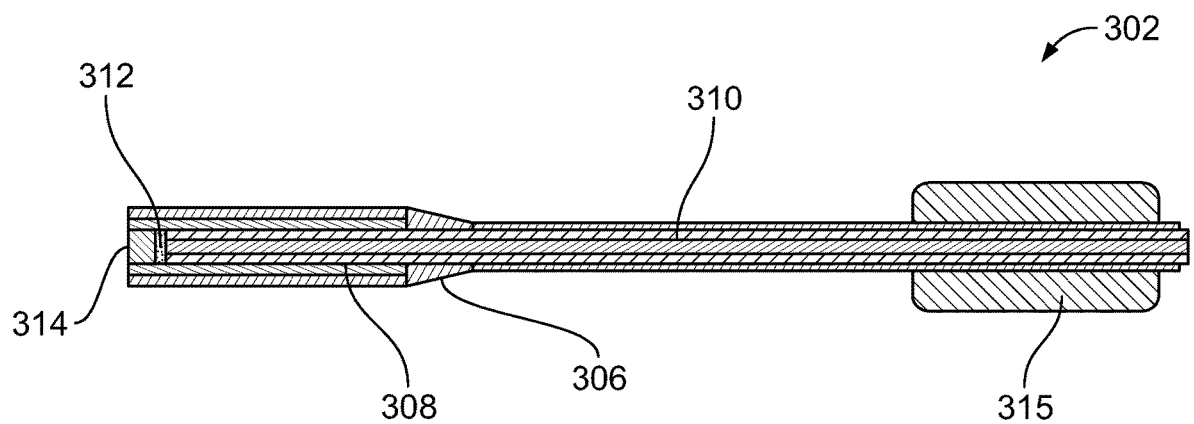
FIG. 3A is a cross-sectional schematic drawing of the ruggedized Cl-ISE electrode of FIG. 1.

FIG. 3A is a cross-sectional schematic drawing of the ruggedized Cl-ISE electrode 302 of FIG. 3. As can be seen in FIG. 3A, the ruggedized Cl-ISE electrode 302 includes a shell or housing 306, a liner 308 within the housing 306, and a conductor 310 within the liner 308. The conductor 310 is in contact with a conductive joining and conductive joining material 312, which is in both physical and electrical contact with a porous frit that forms an ion selective membrane (ISM) 314. In this case, the ion selective membrane is a chloride ion selective membrane. In such an arrangement, chloride ions selectively interact with the ISM 314 which develops a stable electric potential modulated by local chloride concentration. In an embodiment, the ISM 314 may be a porous metal material, such as, but not limited to pressed AgCl or $Ag_2S$ powders. The Cl-ISE electrode 302 is shown connected to a seal 315 that is internal to the electrode connector 304. In this exemplary embodiment, the seal 315 is a Conax High Temperature-High Pressure (HTHP) fitting.

The housing 306 protects the conductor 310. In this exemplary embodiment, the housing 306 is polytetrafluoroethylene (PTFE). In other embodiments, the housing 306 may be composed of other high temperature insulation materials. The liner 308 provides sealing and electrical insulation from the test environment. In an embodiment, 308 is a heat-shrink material composed of polytetrafluoroethylene external with fluorinated ethylene polymer internal melt material. The conductor 310 is a conductive material, such as, but not limited to a conductive metal, fluid, carbon, or other electron conductor. In an embodiment, the conductor may be a copper rod or wire. The conductive joining material 312 mechanically and electrically attaches the ISM pellet to the electron conductor. The conductive joining material 312 may be, but is not limited to an epoxy, solder, or weldment. In an embodiment, the conductive joining material 312 may be a silver-based epoxy.

Electrochemical measurement accuracy is highly dependent upon the performance of the reference electrode. The electrochemical behavior of silver/silver-chloride reference electrodes is well characterized and therefore a common choice when performing Nernstian sample analysis. Commercial liquid solution silver/silver-chloride reference electrodes are a proven technology that has been used for many years in autoclave housed electrochemical measurements. Typically, a central silver wire is coated in silver/silver-chloride and suspended in a liquid electrolyte solution with a semi-porous frit separating the electrolyte from the sample liquid. For high-pressure environments, a bellows system is necessary to equalize pressure on either side of the frit to prevent the part from exploding or dislodging the frit. Additionally, a section of the reference electrode that cannot withstand the high temperature/high pressure environment is mounted outside the autoclave. The system described herein may provide comparable performance to a commercial silver/silver-chloride reference electrode while being more robust, simpler to assemble, entirely solid-state, and can be directly integrated into high-temperature tools.

It was recognised that a stable reference electrode, which was capable of performing while being subjected to the high temperatures and pressures present in most geothermal environments, would be required. Performing reliable chemical tracer sensing and enthalpy measurements within high-temperature and high-pressure aqueous systems is not a straightforward proposition. The stability of internal reference electrodes under the harsh conditions imposed, and will continue to pose, major measurement challenges. The current method of performing these measurements is to physically separate the electrochemically active elements into an 'internal' and 'external' classification.

An internal reference electrode has the potential sensing, electroactive element, maintained at the system temperature and pressure. This allows for the working electrode, counter electrode and reference electrode, to exist in a relative state of thermodynamic equilibrium. An external reference electrode has the electroactive element maintained outside of the high temperature and pressure system, at ambient conditions, with the communicating electrolyte bridge being actively air or water-cooled. This places the two systems at a non-isothermal condition and therefore they are not at equilibrium due to the thermal diffusion phenomena experienced along the cooled electrolyte bridge. The sacrifice made by adopting the external method is loss of precision and the increased need for copious amounts of error correction data.

Figure 4:
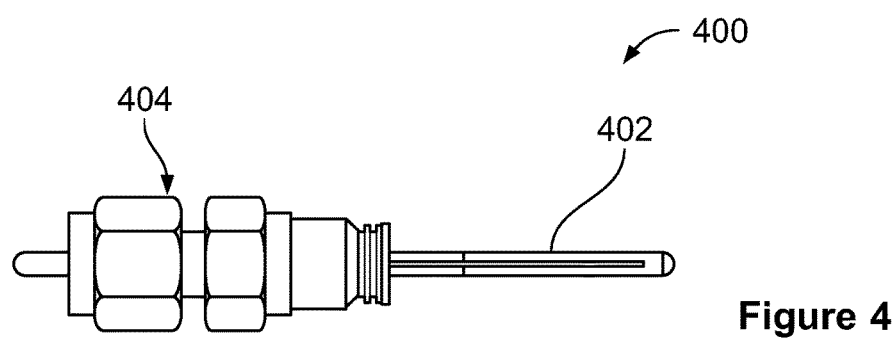
FIG. 4 shows a reference electrode according to an embodiment of the disclosure.

FIG. 4 shows a reference electrode assembly 400 according to an embodiment of the disclosure. As can be seen in FIG. 4 the reference electrode assembly 400 includes a reference electrode 402 and an electrode connector 404. The electrode connector 402 may be any connector capable of sealing the reference electrode 402 against fluid and pressure when fitted to a member.

Figure 4A:
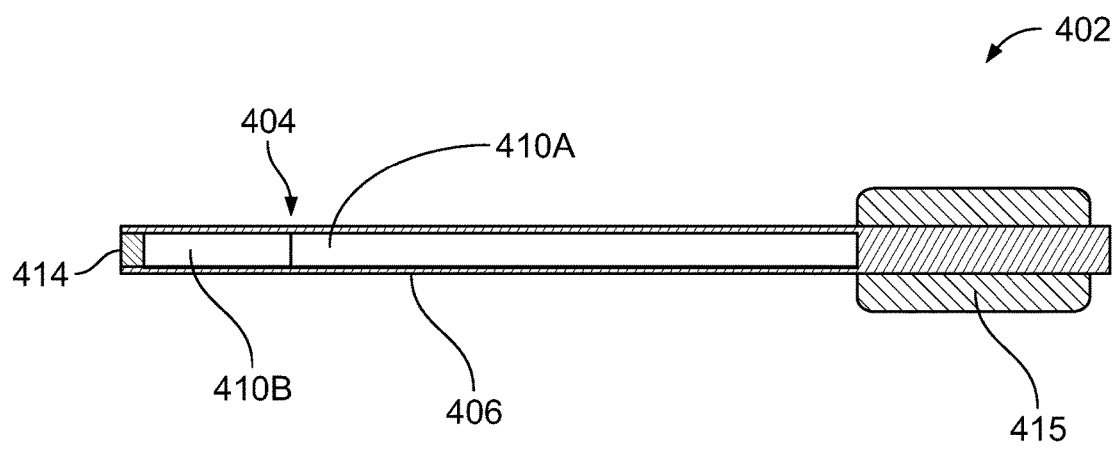
FIG. 4A is a cross-sectional schematic drawing of the reference electrode of FIG. 4.

FIG. 4A is a cross-sectional schematic drawing of the reference electrode 402 of FIG. 4. As can be seen in FIG. 4A, the reference electrode 402 includes a shell or housing 406, a conductor 410 within the liner 308. The conductor 410 is in contact with a porous frit or ion selective membrane 414. In such an arrangement, ions interacting with the ISM 414 set up an electrochemical potential which can be measured against a reference electrode to determine the concentration of the selected ion. In an embodiment, the ISM 414 may be a porous metal material, such as, but not limited to pressed AgCl or $Ag_2S$ powders. The reference electrode 402 is shown connected to a seal 415 that is internal to the electrode connector 404. In this exemplary embodiment, the seal 415 is a Conax High Temperature-High Pressure (HTHP) fitting.

The housing 406 protects the conductor 410. In this exemplary embodiment, the housing 406 is polytetrafluoroethylene (PTFE). In other embodiments, the housing 406 may be a polymer. The conductor 410 allows for the movement of electrons. In this exemplary embodiment, the conductor 410 is formed of a first conductor 410A and a second conductor 410B. In this exemplary embodiment, the first conductor 410A is formed of a solid conductive metal rod or wire, for example, but not limited to Ag or Cu wire. The second conductor 410B is formed of a conductive solution, for example, but not limited to a $CuSO_4$ or KCl solution. For example, the conductor 410 may be a 1 M $CuSO_4$ and copper wire or 3 M KCl solution and a silver wire coated with AgCl.

Figure 5:
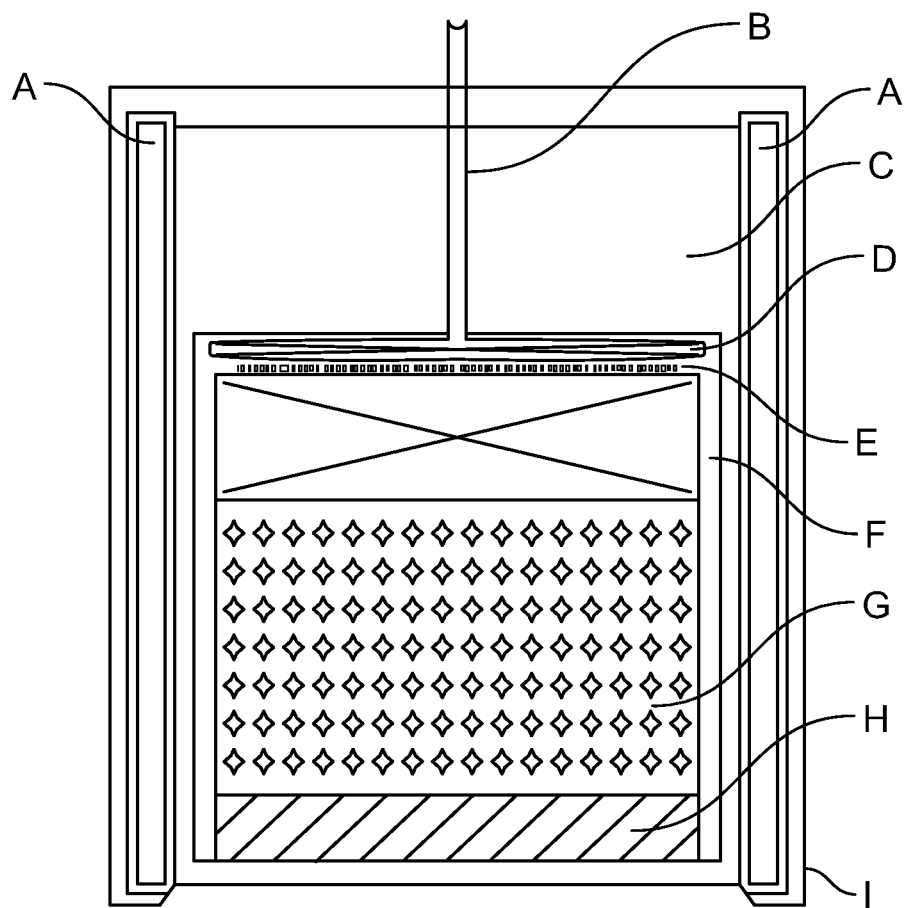
FIG. 5 shows a partial cut away view of a reference electrode according to another embodiment of the disclosure.

FIG. 5 shows a partial cut away view of another reference electrode according to another embodiment of the disclosure. The reference electrode is an all solid-state design and would be connected to an electrode connector, not shown, but similar to that shown in FIGS. 3 and 4. As can be seen in FIG. 5, the reference electrode includes a shell or housing I, a first or outside liner A and a second or inside liner C, and a conductor B disposed within the liner 508. The conductor B is in contact with a bimodal pellet F/G via conducing elements D/E. The bimodal pellet F/G is formed of a salt element composite component F and a salt component G. The salt component G is in contact with HG frit H. In such an arrangement, ions contacting the HT frit H can pass through bimodal pellet F/G to the conductor B.

In this exemplary embodiment, the shell I is formed of polytetrafluoroethylene (PTFE), however, in other embodiments, the shell I may be formed of another casing material, but as, but not limited to a fluoropolymer. In this exemplary embodiment, the outer liner A is an alumina tube, however, in other embodiments, the outer liner may be formed of a polymer, metal or ceramic material. In this exemplary embodiment, the inner liner C is a HT epoxy, however, in other embodiments, the inner liner may be formed of another joining material. In this exemplary embodiment, the conducting elements D/E are a silver disk and a HT silver conductive epoxy adhesive, however, in other embodiments, the conducting elements may be other arrangements of metals, conductive joining materials and combinations thereof.

The conductor B conducts electrons to the instrumentation where the potential is measured. In this exemplary embodiment, the conductor B is a silver wire, however, in other embodiments, the conductor may be formed of a solid conductive metal rod or wire, for example, but not limited to Ag or Cu wire. As discussed above, the bimodal pellet F/G is formed of a first portion F and a second portion G in contact with one another. The first portion F is in contact with the conductor B via conducting elements D/E. The second portion G is in contact with the HT frit H. The first portion F is formed of a pressed, porous conductive material. In this exemplary embodiment, the first portion F is formed of pressed, conductive, composite powder (see FIG. 7 and discussion below). The second portion G is formed of a solid pressed salt pellet, for example but not limited to KCl crystal. The second portion may be any solid chloride-containing salt powder pressed into a solid pellet.

Figure 6:
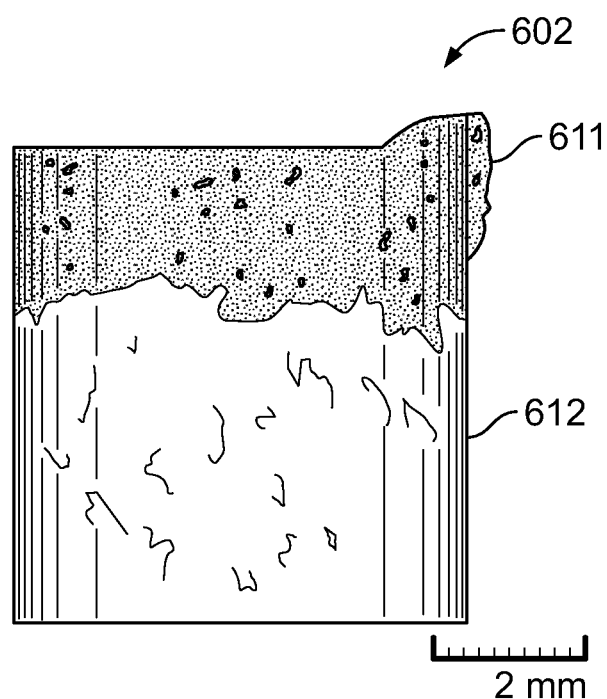
FIG. 6 is an illustration of a bimodal pellet after pressing according to an embodiment of the disclosure.

FIG. 6 is a representation of a bimodal pellet 602 according to an embodiment of the disclosure. As can be seen in FIG. 6, the bimodal pellet 602 includes a first portion 611 and a second portion 612. The first portion 611 is formed of synthesized particles, described in the discussion of FIG. 7. The second portion 612 is formed of a salt material.

Figure 7:
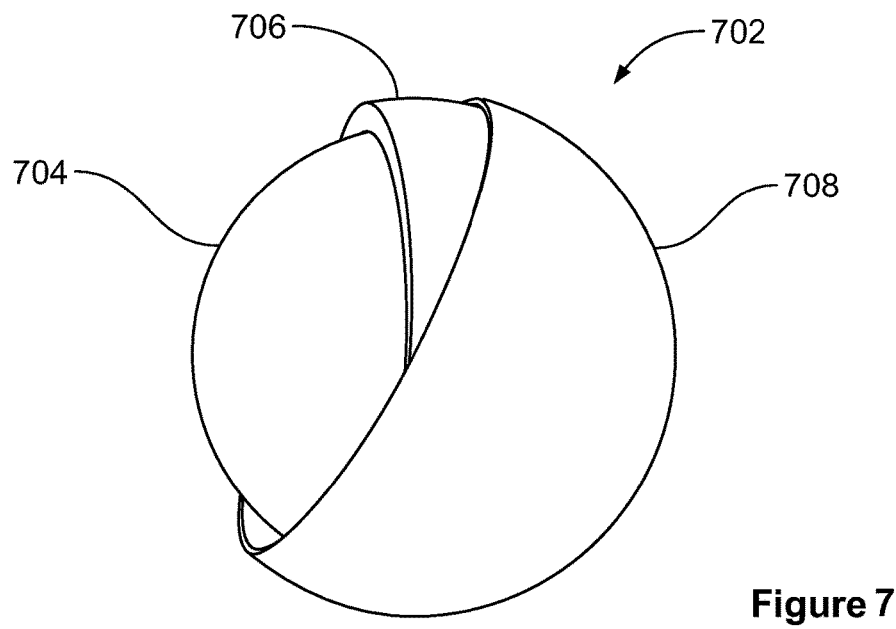
FIG. 7 is a representation of synthesized particles according to an embodiment of the disclosure.

FIG. 7 is a representation of a synthesized particle 702 used to form the first portion 511 according to an embodiment of the disclosure. As can be seen in FIG. 7, the particle 702 includes a central conductive graphite sphere 704 coated with a conductive layer 706 and subsequently an outside layer or coating 708. In this exemplary embodiment, the conductive layer 706 is an elemental silver coating. In this exemplary embodiment, the outside coating 708 is a silver-chloride (AgCl) layer. In this exemplary embodiment, the particle 702 has a diameter of 0.1 to 100 microns.

The bimodal pellet 602 (FIG. 6) is formed by pressing a mass of particles 702 with a mass of silver chloride particulate material. For example, a bimodal pellet was formed by placing a layer of 250 milligrams of the silver and silver chloride coated graphite powder in a pellet die followed by a layer of 250 milligrams of pure potassium chloride. The two components are pressed into a single bimodal pellet at approximately 5 tons with a dwell time of 8 hours. In another example, a bimodal pellet was formed by the following steps:

1. A 70\30 mixture by mass of Micro Powders FLUO-850TX high temperature polytetrafluoroethylene powder and Cotronics Resbond 940 zirconia ceramic powder is mixed. To the mixture, a 10% by combined mass addition of finely ground potassium chloride is ground in a mortar and pestle until fully incorporated.
2. A 1:1 mixture by mass of finely ground potassium chloride and silver chloride is ground in a mortar and pestle until fully incorporated.
3. Materials H, G, and F are layered in order and pressed in a 6.35 mm pellet die at 4000 psi for 30 minutes.
4. The pellet is sintered at 342° C. for 25 minutes.
5. Material E, (Duralco 124 Silver Epoxy) is applied to the top of the pellet. The silver disk and silver conductor are attached.
6. Assembly is again cured at 120° C. for 24 hours.
7. Assembly is placed in Material A and encased in Material C. (Cotronics Duralco 4538 High Temperature Epoxy)
8. The new assembly is cured at 120° C. for 24 hours.
9. Cured Assembly is covered in Material I, (Zeus Duel-Shrink) and heated, in an oven at 342° C., or a baffled heat gun, until tubing shrinks, melts, and fully seals the electrode.

Figure 8:
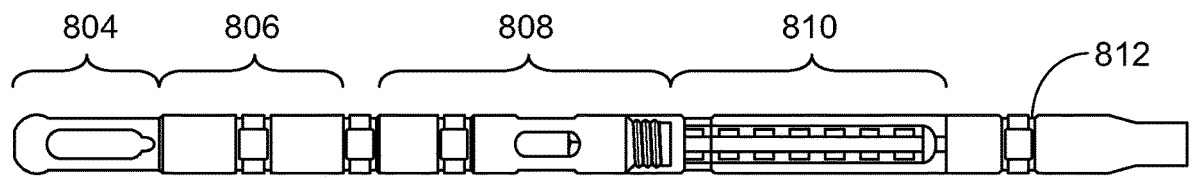
FIG. 8 is a schematic drawing of the wireline tool incorporating the new Cl-electrochemical sensor.

FIG. 8 is a schematic of our wireline tool 802 according to an embodiment of the disclosure. The wireline tool 802 is used to determine the downhole conditions of pressure, temperature, flow rate, and chloride concentration which are analyzed at the surface to determine enthalpy. As can be seen in FIG. 8, the wireline tool 802 includes a spinner section 804, a pressure transducer section 806, an electrodes and thermocouple section 808, a high temperature (HT) electronics package section 810, and an interface section 812. The spinner section 806 includes an angled blade dynamo system with a direction and spin rate that correlate to aggregate fluid flow. The pressure transducer section 806 includes a high temperature sensor for wellbore pressures.

The electrodes and thermocouple section 808 includes the electrochemical sensing electrodes which are housed in a tool section in contact with the wellbore fluid. The HT electronics package section 810 includes the electrochemical interface electronics, the sensor signal multiplexer, the analog to digital converter, the microcontroller, and the digital communication system. The interface section 812 connects to a high-temperature 7-conductor wireline for power and bidirectional digital communications between the tool and the computer interface at the surface. The tool analysis system includes hardware, firmware and software for analyzing and displaying signals from the tool 802.

Figure 9:
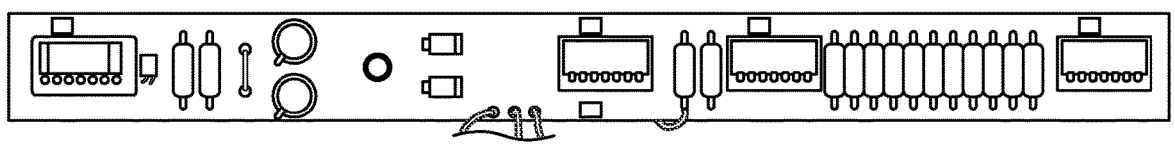
FIG. 9 is an illustration of a populated printed circuit board of the electrochemical sensor signal conditioning circuitry according to an embodiment of the disclosure.
Figure 10:
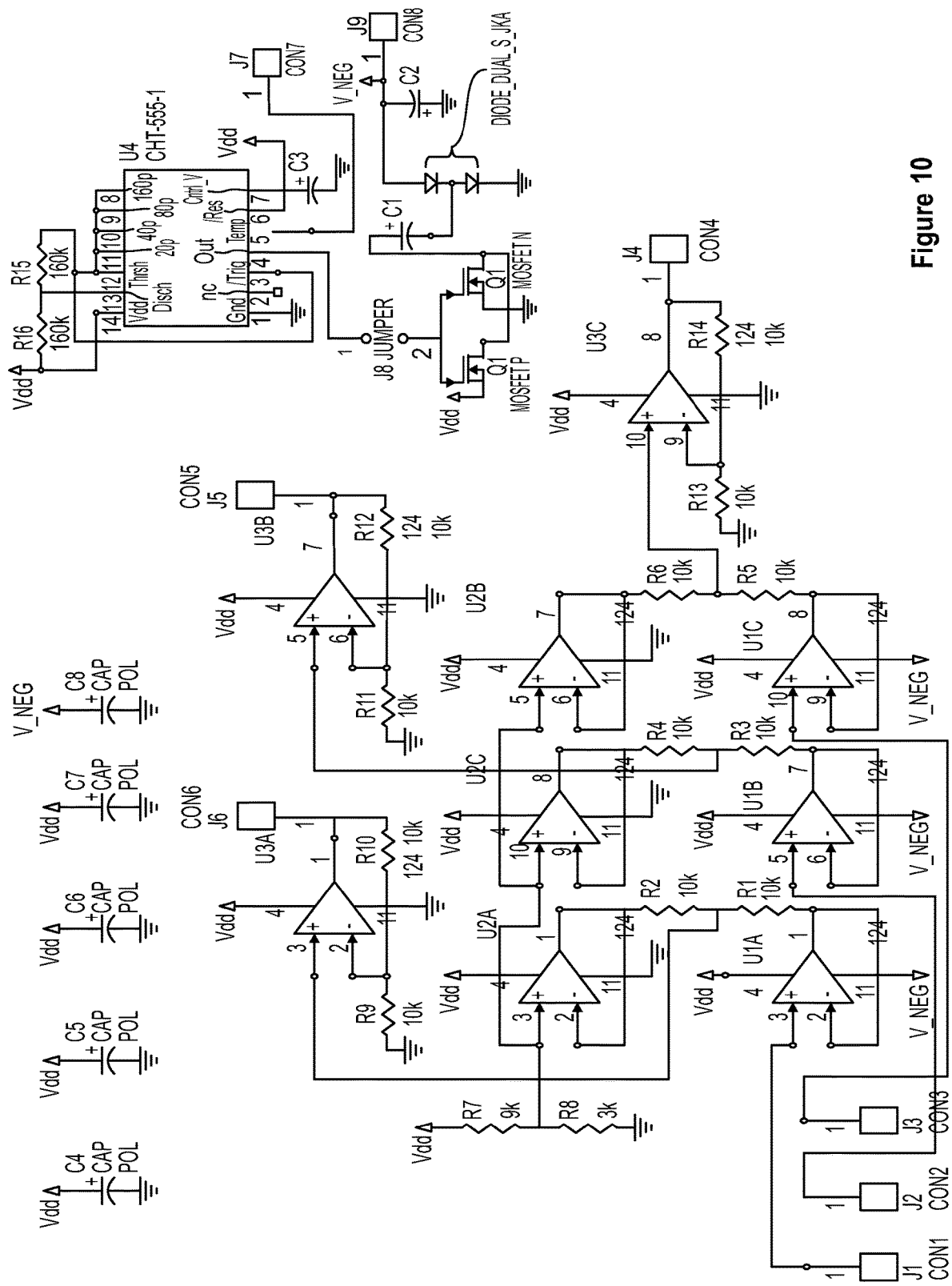
FIG. 10 is an illustration of a circuit schematic of the high temperature signal conditioning circuitry according to an embodiment of the disclosure.

Extreme temperature electronics components are extremely limited compared to the available components at standard temperature. As a relevant example, currently available high temperature (>220° C.) analog-to-digital converters typically only operate in the positive voltage range, typically 0V to +5V. Electrical potentials generated by the sensors used in this disclosure for measuring downhole enthalpy can range from approximately negative 2 volts to positive 2 volts. To make the sensor voltage compatible with the selected ADC and multiplexer electronics, a negative supply rail and a level shifter are required. FIGS. 9 and 10 show a HT circuit board and circuit board schematic showing how the negative supply rail is accomplished using a diode network and switched capacitor design clocked by a high temperature 555 timer in a stable multi-vibrator configuration. The level shifter is accomplished using buffer and summing high temperature operational amplifier circuits. Additional electronics measure each electrode potential sampled through a separate channel of a high temperature multiplexer and the potential difference between the reference electrode and sample electrode are computed either in software up hole or downhole on the high temperature microcontroller. In other embodiments, the electronics can measure the working electrode and reference electrodes differentially or monitor by current injection with a custom high temperature potentiostat.

In addition to component performance challenges with high temperature circuitry, careful consideration must be given to the board design itself. Electrical trace work can delaminate from the printed circuit board (PCB) substrate material due to adhesive degradation, material oxidation, or thermal expansion rate mismatch between PCB materials. Surface mount components can often completely separate from the board. High temperature polyimide substrate material is used as the PCB base. To address surface mount component issues, surface mount PCB footprints are designed with a plated through-hole and mirror PCB footprint on the opposing side of the board. This costs space on both sides of the board but provides mechanical support to keep the pads in place. Where possible, trace work is laid in internal PCB layers to prevent degradation and delamination. Exposed copper on the PCB surface is plated with gold to prevent oxidation.

EXAMPLE

Figure 11:
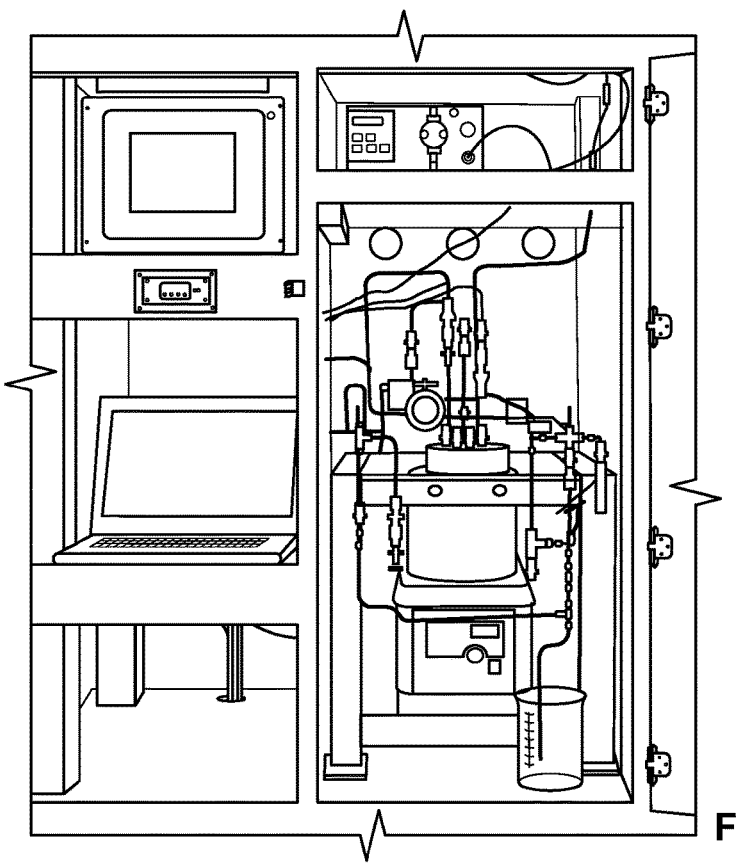
FIG. 11 illustrates a one-liter autoclave and solution delivery system used in our high temperature and pressure measurements according to an embodiment of the disclosure.

High temperature and pressure experiments were conducted in a 1 L autoclave shown in FIG. 11. An HPLC pump (SSI Series 3) was used to deliver test solution to the autoclave. Cl-ISE measurements were conducted using 0.1 M KNO3 as the supporting electrolyte. Chloride concentration was adjusted using the method of standard additions while under continuous stirring. The measurements were made using a NI-9207 16-bit analog to digital converter that simultaneously monitors the potential of Cl-ISE and reference electrodes. The autoclave itself was grounded and all the potential measurements are referenced to it. The potential difference was obtained by subtracting the reference electrode potential from the Cl-ISE potential.

Chloride Ion Selective Electrode Measurements

An electrochemical approach was used to measure chloride ion concentration based on its ability to ruggedize the sensor hardware for operation in harsh environments and the relatively straightforward data processing used to make open circuit potential measurements. The reference electrode used was similar to that shown in FIG. 4.

Figure 12:
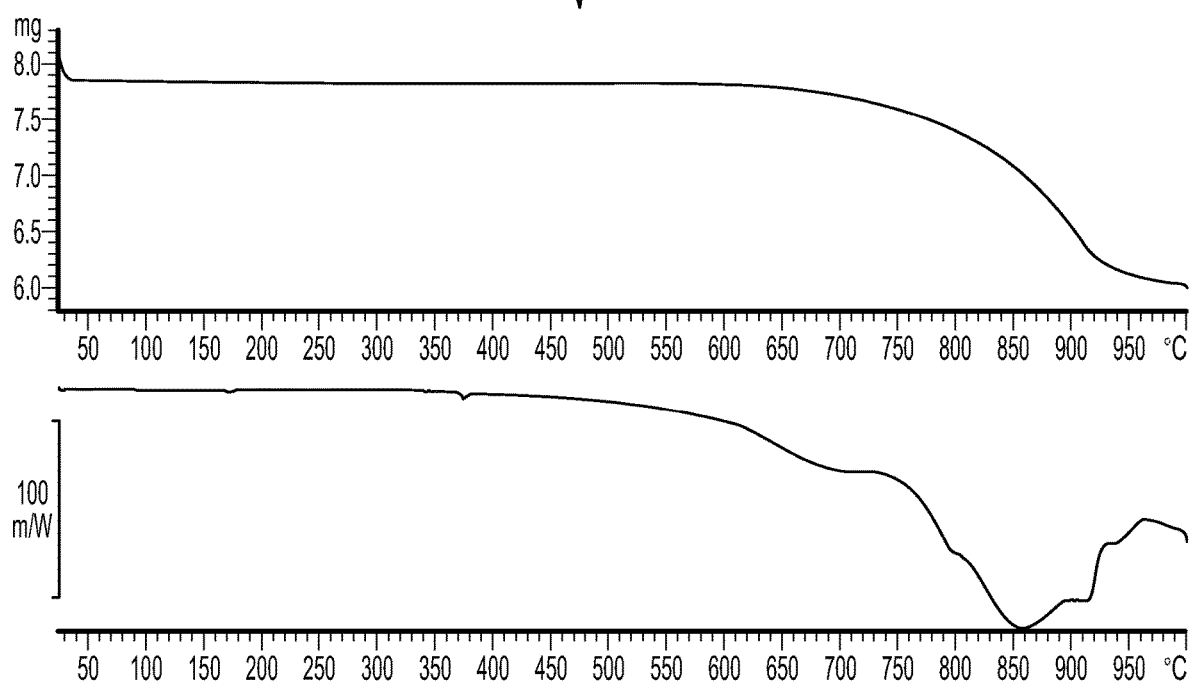
FIG. 12 shows thermal analysis of a 1:1 AgCl—Ag2S mixture. (Top) Thermogravimetric Analysis (TGA) data and (bottom) Differential Scanning calorimetry (DSC) data.

The chloride ion selective membrane used in this study consisted of a mixture of AgCl and $Ag_2S$ powders pressed into pellets with cylindrical geometries. In order to efficiently screen a number of different Cl-ISE designs, the majority of experiments were conducted under ambient temperature and pressure conditions. The thermal stability of the ISM was studied by TGA and DSC analyses and is shown in FIG. 12 for a mixture of AgCl and $Ag_2S$ in a 1:1 ratio. These data show that there is no significant mass loss below 750° C. The DSC data shows a single phase transition at relatively low temperature. This small peak, at 177° C., is the $Ag_2S$ alpha to beta phase transition. Based on the thermal analysis of the membrane material we expect it to survive the high temperature conditions found in many geothermal reservoirs.

Figure 13:
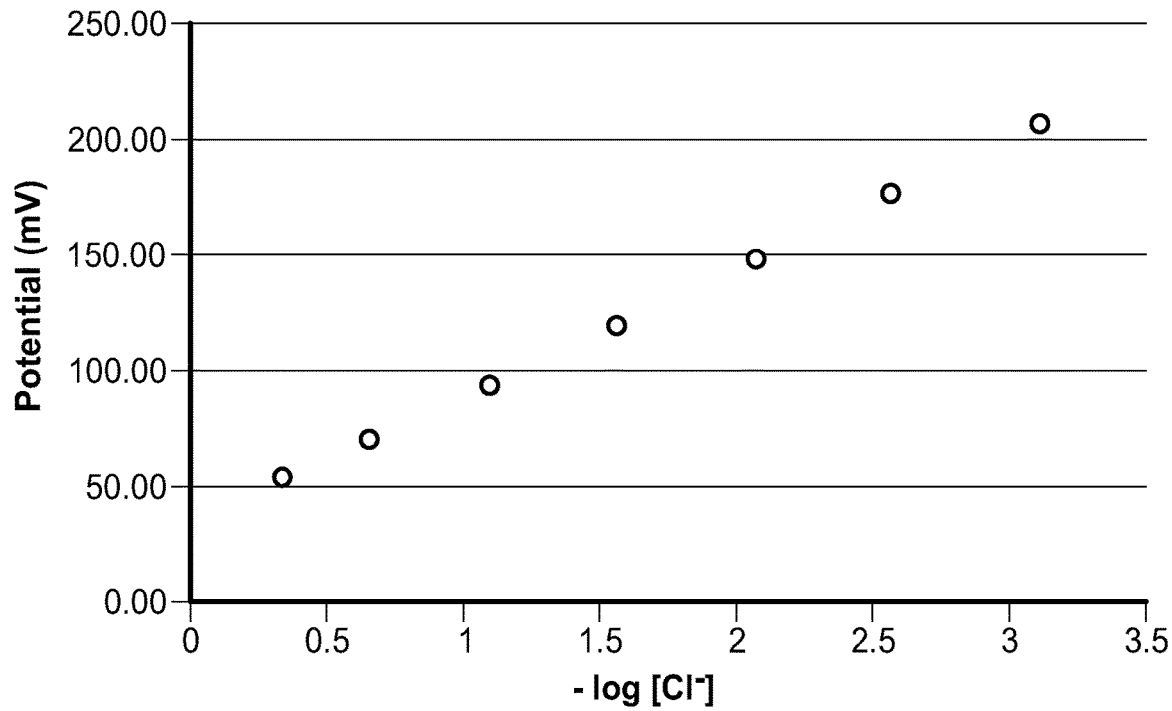
FIG. 13 shows Cl-ISE response at ambient temperature and pressure using 0.1 M KNO3 as a supporting electrolyte. A linear response was seen with a R2 of 0.9997 and a slope of 55.3 mV/decade.
Figure 14:
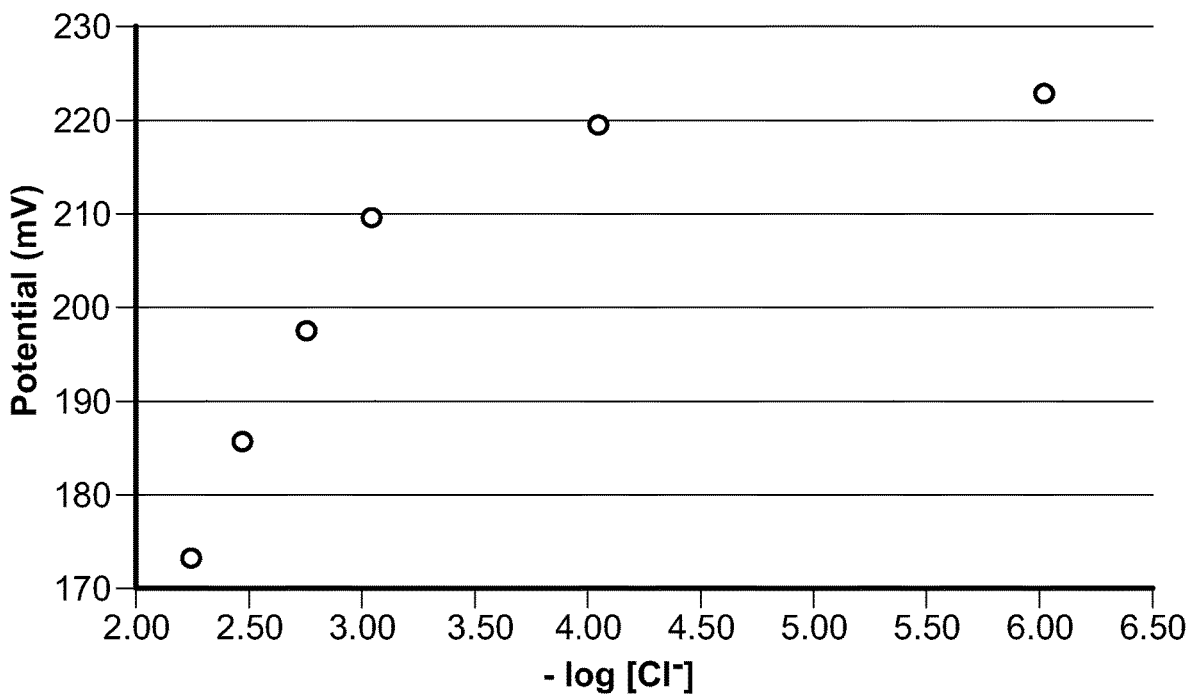
FIG. 14 shows Cl-ISE response at 70° C. and ambient pressure using 0.1 M KNO3 as supporting electrolyte. The linear response is seen between a pCl of 1.0-3.0 with a $R^2$ of 0.9924 and a slope of 55.617 mV/decade.
Figure 15:
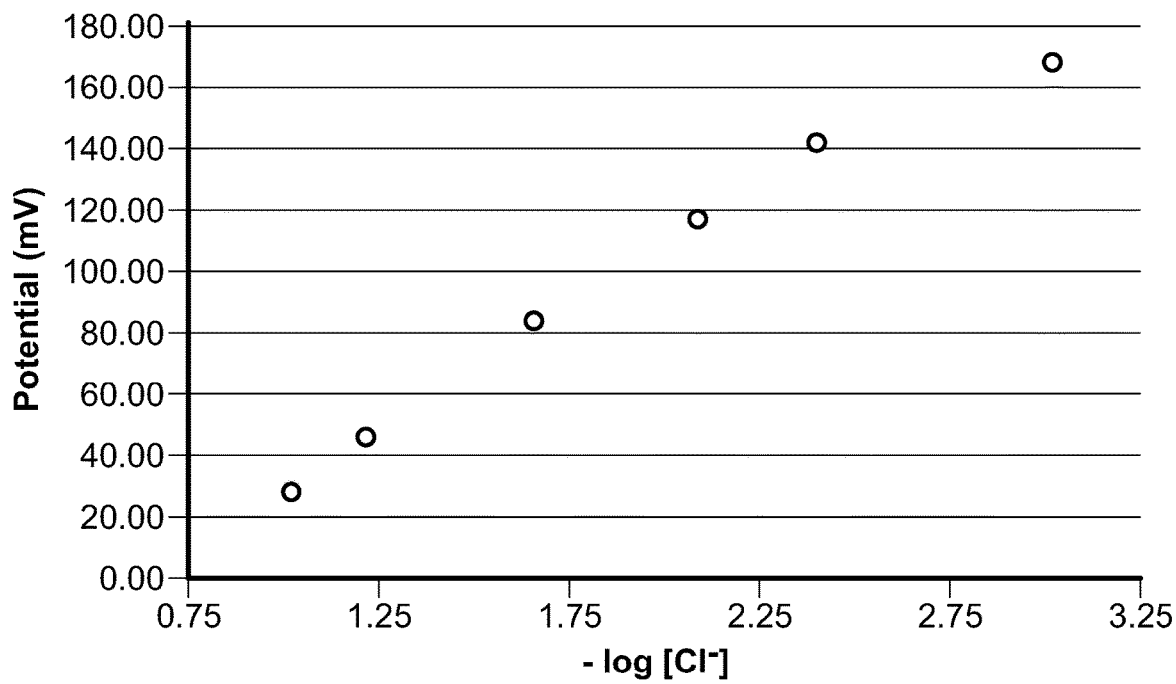
FIG. 15 shows Cl-ISE response at 200° C. and 1279 psi using 0.1 M KNO3 as a supporting electrolyte. The linear response seen between a pCl of 1.00-2.4 had a $R^2$ of 0.9993 and a slope of 82.4 mV/decade. The linear response seen for the entire set has a $R^2$ of 0.983 and a slope of 72.382 mV/decade.
Figure 16:
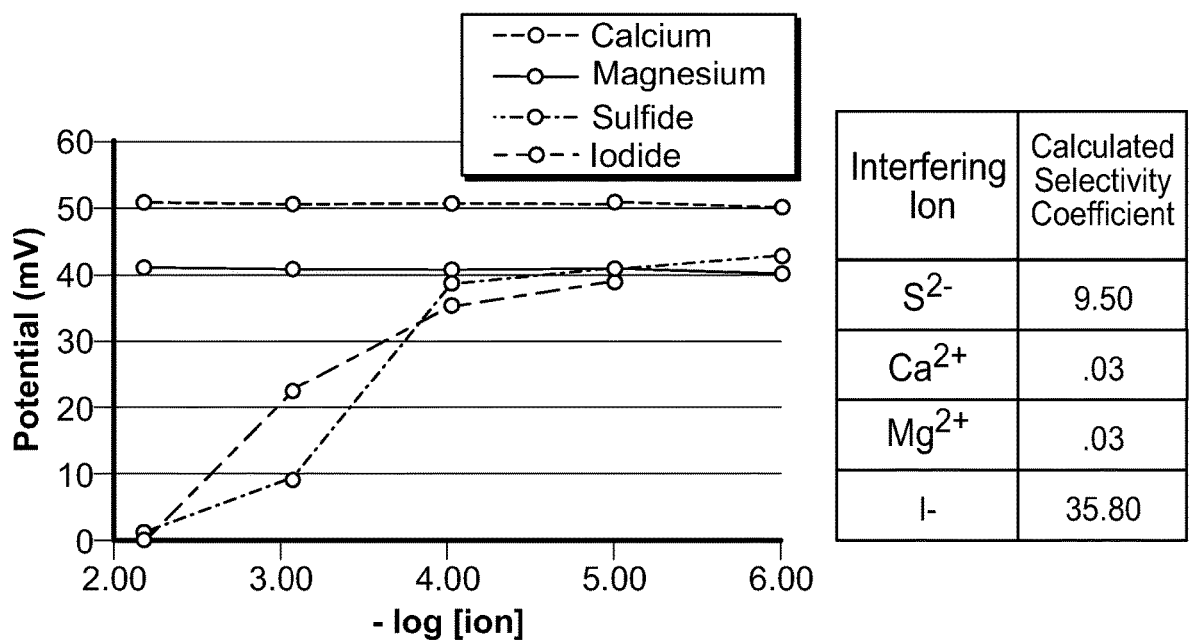
FIG. 16 shows Cl-ISE potential response with different ions at ambient temperature and pressure.

A ruggedized Cl-ISE design has been tested under elevated temperature and pressure conditions similar to those found in some geothermal wells. It is of note that because these experiments have only recently begun these results are still considered preliminary. FIGS. 13-15 contain plots showing electrode responses at ambient temperature, 70° C., and 200° C., respectively. The 200° C. experiment was performed in the autoclave with an average pressure of 1279 psi. The supporting electrolyte was 0.1 M KNO3. The experiment shows that the Cl-ISE design has approximately Nernstian response for chloride concentrations in the $10^{-3}$M to $10^{-1}$ M range with a slope of 55 mV/decade and 72-82 mV/decade for the two low temperature runs and 200° C. run, respectively, with $R^2$ values of 0.99 and 0.98-0.99. From this, it can be observed that there is a shift to less positive electrode potential as the temperature increases. While more data is clearly needed, these results indicate that a stable enough response is available with this electrode design that will allow us to detect changes in chloride concentration under geothermal-relevant conditions.

The Cl-ISE potential was tested in the presence of an assortment of ions that are common in a geothermal reservoir. Referring to FIG. 9, the purpose of this experiment was to determine if any such ion interferes with the selective measurement of chloride. The cations $Ca^{2+}$ and $Mg^{2+}$ shows a single response at all concentrations indicating no interference to the electrode. The anions $S^{2-}$ and $I^-$, however, show a significant potential drop with increased concentration. These results are reflected in the calculated value associated with these measurements, known as the selectivity coefficient, and describes the extent of interference of a specific ion. The larger the coefficient, the greater the interference. $I^-$ was determined to have the greatest impact on the potential while the cations had little to no effect.

Based on the above data it was suspected that the interference effect comes from anion exchange between chloride in the ISM and iodide/sulfide in solution. Such exchange would be due to the difference in silver halide solubility. Qualitative and quantitative tests were performed to confirm this hypothesis. First, a small amount of AgCl(s) was added to solutions of KI and $Li_2S$ to colorimetrically determine anion exchange. Off-white AgCl(s) turned to yellow in the iodide solution and black in the sulfide solution. These colors match commercial AgI and $Ag_2S$, respectively, supporting anion exchange.

Finally, once the qualitative measurements of anion exchange were confirmed, the quantitative extent of the exchange was of interest, as degradation of the ISM was expected to increase with greater exchange. Three solutions (0.1, 0.01, and 0.001 M) were made for both iodide and sulfide using KI and $Li_2S$, respectively. A precise amount of AgCl(s) was added to each of these vials and allowed to stir overnight followed by solution analysis using ion chromatography. The results indicate the majority of mixtures completely exchange the $Cl^-$ in the ISM for the solution anion. These results support the claim of surface anion surface exchange on the ISM pellet and thus the observed interference.

The invention being thus described, it will be obvious that the same may be varied in many ways. Such variations are not to be regarded as a departure from the spirit and scope of the invention, and all such modifications, as would be obvious to one skilled in the art, are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A device, comprising:
    a pressure transducer;
    a chloride ion selective electrode;
    an ionic strength reference electrode;
    a thermocouple; and
    an electronic package comprising a high temperature circuit board capable of processing pressure data from the pressure transducer, chloride concentration data from the chloride ion selective electrode, electrochemical potential data from the ionic strength reference electrode and temperature data from the thermocouple to calculate enthalpy of a fluid from which the data is obtained;

wherein the ionic strength reference electrode comprises a bimodal pellet disposed within a shell, wherein the bimodal pellet comprises a first portion and a second portion, the first portion comprising a plurality of composite particles comprising graphite sphere cores, a silver coating surrounding the graphite sphere cores, and a silver layer surrounding the silver coating, and the second portion comprising a salt crystal;

wherein a conductor is in contact with the bimodal pellet via conducting elements; and wherein the second portion is in contact with a porous fit.

2. The device of claim 1, further comprising:
a fluid velocity measurement device.

3. The device of claim 1, wherein the electronic package is in communication with the pressure transducer, the chloride ion selective electrode, the ionic strength reference electrode and the thermocouple and includes electronics to send data to a system not in the device.

4. A system, comprising:
a device comprising:
  a pressure transducer;
  a chloride ion selective electrode;
  an ionic strength reference electrode;
  a thermocouple; and
  an electronic package comprising a high temperature circuit board capable of processing the pressure transducer, the chloride ion selective electrode, the ionic strength reference electrode and the thermocouple; and
a processing system that receives data from the device and computes a reservoir enthalpy of a geologic formation by using measured changes in liquid-phase ion concentration to calculate liquid to steam proportions;

wherein the ionic strength reference electrode comprises a bimodal pellet disposed within a shell, wherein the bimodal pellet comprises a first portion and a second portion, the first portion comprising a plurality of composite particles comprising graphite sphere cores, a silver coating surrounding the graphite sphere cores, and a silver layer surrounding the silver coating, and the second portion comprising a salt crystal;

wherein a conductor is in contact with the bimodal pellet via conducting elements; and wherein the second portion is in contact with a porous frit.

5. The system of claim 4, further comprising:
a fluid velocity measurement device.

6. The system of claim 4, wherein the electronic package is in communication with the pressure transducer, the chloride ion selective electrode, the ionic strength reference electrode and the thermocouple and includes electronics to send data to a system not in the device.

7. A method, comprising:
inserting a tool into a well in a geologic formation;
measuring temperature, fluid velocity, and pressure at one or more locations in the well; and
calculating enthalpy at the one or more locations in the well by using measured changes in liquid-phase ion concentration to calculate liquid to steam proportions; and
calculating enthalpy for the geologic formation;
wherein the measured changes in liquid-phase ion concentration are measured by a ionic strength reference electrode comprising a bimodal pellet disposed within a shell, wherein the bimodal pellet comprises a first portion and a second portion, the first portion comprising a plurality of composite particles comprising graphite sphere cores, a silver coating surrounding the graphite sphere cores, and a silver layer surrounding the silver coating, and the second portion comprising a salt crystal;

wherein a conductor is in contact with the bimodal pellet via conducting elements; and wherein the second portion is in contact with a porous frit.

* * * * *